Oct. 15, 1968     D. L. FRIES     3,405,533
CABLE LAYER
Filed Oct. 26, 1964     3 Sheets-Sheet 1
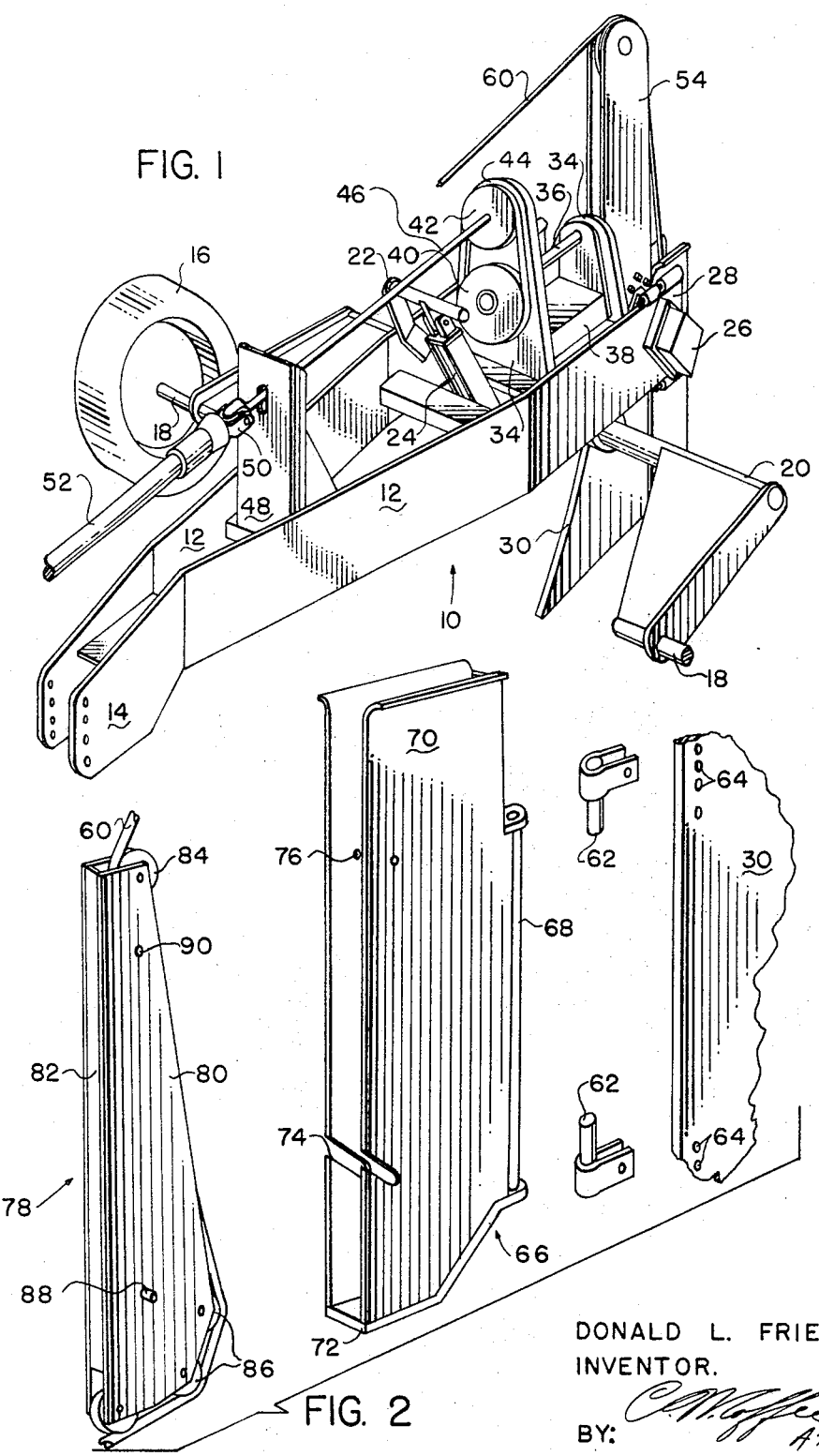
DONALD L. FRIES
INVENTOR.
BY:

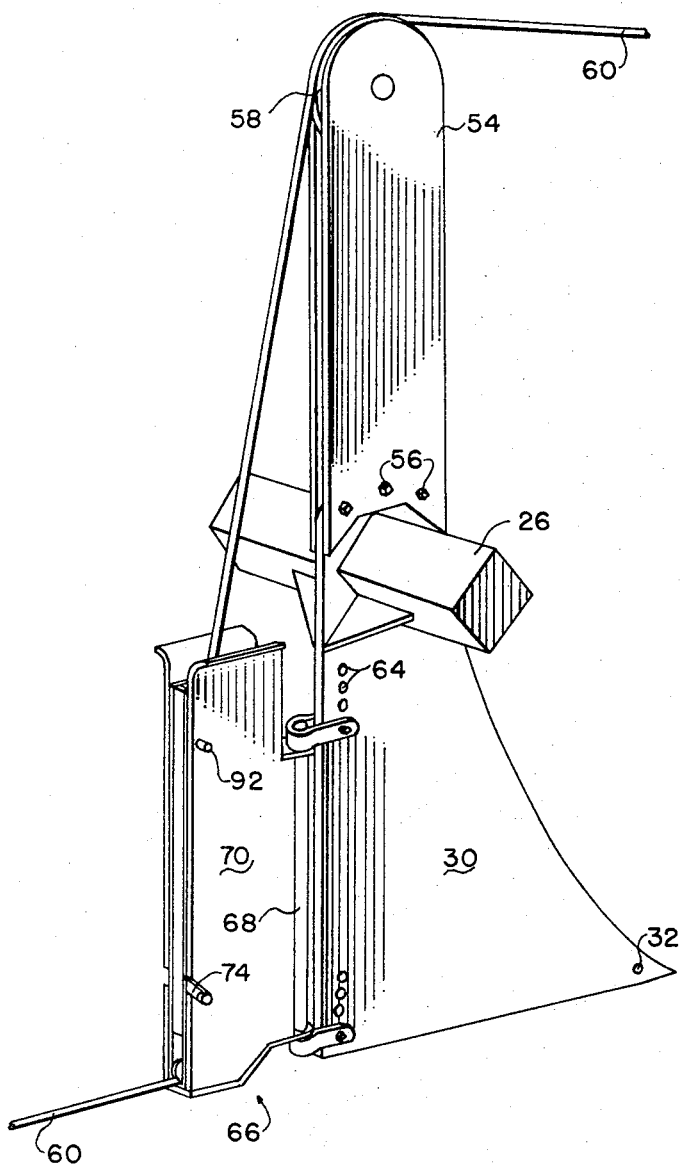

Oct. 15, 1968  D. L. FRIES  3,405,533
CABLE LAYER

Filed Oct. 26, 1964  3 Sheets-Sheet 3

DONALD L. FRIES
*INVENTOR.*

BY
*Atty.*

United States Patent Office 3,405,533
Patented Oct. 15, 1968

3,405,533
CABLE LAYER
Donald L. Fries, Perryton, Tex., assignor of one-half to Lubbock Manufacturing Company, Lubbock, Tex., and one-half to Perrytex Machinery Company, Perryton, Tex., both corporations of Texas
Filed Oct. 26, 1964, Ser. No. 406,282
5 Claims. (Cl. 61—72.6)

ABSTRACT OF THE DISCLOSURE

A plow-type cable layer has a rotating eccentric weight vibrator. Apparatus to lead the cable to the bottom of the furrow made by the plow includes an outer case pivoted to the back of the plow by two vertical pintles. An inner case with pulleys to guide the cable is held in the outer case by pins.

This invention relates to laying cable and more particularly to a vibrating plow for forming a furrow and laying the cable in the furrow.

In modern technology, often cables are buried underground. For example multi-strand telephone cables extending between cities often are buried. In addition to cables, often flexible tubes used to carry water or other fluids are buried underground.

Previous practice has been to attach a guide means to a plow so that the plow forms a furrow and the guide means guides the cable to the bottom of the furrow.

By vibrating the plow, the plow moves through the earth easier and therefore forms a deeper furrow with less draft. Furthermore, the vibration aids the passage of the cable through the guide.

An object of this invention is to provide a machine for laying cable underground.

Another object of this invention is to vibrate a cable laying machine so that the power required to lay the cable is materially reduced.

Further objects are to achieve the above with a device that is sturdy, compact, durable, simple and reliable, yet inexpensive and easy to manufacture and operate.

Still further objects are to achieve the above with a method that is rapid, inexpensive, and easy for inexperienced, unskilled people to perform.

The specific nature of the invention as well as other objects, uses, and advantages thereof will clearly appear from the following description and from the accompanying drawing, the different views of which are not necessarily to the same scale in which:

FIG. 1 is a perspective view of a machine according to this invention with parts broken away for clarity.

FIG. 2 is an exploded perspective view showing a portion of the plow shank with the cable guide shown in the separate pieces.

FIG. 3 is a perspective view of the assembled cable guide on the shank with the beam removed from the remainder of the machine.

Figure 5:
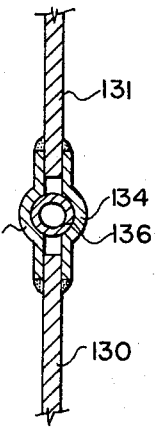
FIG. 5 is a sectional view of the embodiment of FIG. 4 taken on line 5—5 of FIG. 4.

Referring more particularly to FIG. 1, it may be seen that a principal part of the machine is frame 10.

The frame 10 includes two side plates 12 with numerous cross braces between them. Each side plate has a plurality of holes 14 at the forward end thereof forming hitch means on the frame for attaching the frame to a towing power vehicle (not shown). Ground engaging wheels 16 (one of which is not shown for clarity) are mounted on spindles 18 which are a part of crank axle 20. The axle 20 is journaled to the underside of the frame 10 for rotation. Arm 22 is welded to the axle 20 and moved by hydraulic cylinder 24. Thus rotation of the crank axle 20 by the hydraulic cylinder 24 will raise and lower the wheels according to the manipulation of the operator. It is expressed that the wheels 16 will raise and lower with respect to frame 10, however it will be understood that if the wheels are engaging the ground that when the wheels 16 are lowered, this raises the frame 10 or if the wheels are raised the frame is lowered.

Beam 26 extends between the side plates 12 and is tightly clamped thereto by clamps 28. Plow shank 30 is pendently attached to the beam 26 by welding. The forward tip of the plow shank has a hole 32 forming a means for attaching a plow point to the forward tip as is common practice in the art.

Two bearing pedestals 34 are connected to the frame 10 and extend upward from the frame in front of beam 26. Shaft 36 is journaled for rotation between the pedestals 34. The shaft 36 is aligned with the direction of draft which is generally parallel to the side plates 12 and normal to the beam 26. Weight 38 is connected to the shaft 36 eccentrically thereof by two side plates (only one of which shows in the drawing). Pulley 40 is mounted upon the shaft 36 forward of the forward pedestal 34. The pulley 40 is rotated by pulley 42 through belt 44. The pulley 42 is mounted upon shaft 46 which is journaled between the front pedestal 34 and auxiliary pedestal 48. Universal joint 50 connects the front of the shaft 46 to shaft 52 which extends forward to the power towing vehicle (not shown) and is driven from the power take-off connection thereof. From the above description it may be seen that rotation of the shaft 52 will rotate the shaft 36 which with its eccentric weight 38 will induce a vibration into the frame 10 and thus into the shank 30. As discussed above this vibration permits the plow shank 30 to plow a deeper furrow with less power.

Stanchion 54 is attached by a plurality of bolts 56 to the top of the plow shank 30. Pulley 58 is attached at the top of stanchion 54. Cable 60 is trained over the top of the pulley 58. Means for guiding the cable 60 to the bottom of the furrow is attached to the back of the shank 30 by pivoting. This attachment is accomplished in such a manner which resembles the rudder of a boat. Therefore the cable guide means does not have to withstand the lateral stresses of the vibration.

Pintles 62 are attached to the rear of the plow shank 30. Each is attached by bolting the pintle 62 connection to one of a plurality of hole 64 so that the vertical height of the pintle and thus the depth of the cable 60 may be adjusted as shown in FIG. 3, the cable 60 would be at the lowest depth. Outer case 66 has a vertical tube 68 at the forward edge thereof within which the pintles 62 are inserted. Therefore the outer case 66 and thus the guide is pivoted to the plow shank 30. The outer case 66 includes two side plates 70 attached by a strap or shoe 72 at the bottom. The front of the side plates 70 are attached to the tube 68. The side plates 70 each have an inclined slot 74 in the rear thereof for holding the pulley frame 78 in place as will be explained later. Also each plate 70 has an aligned hole 76 therethrough.

Pulley frame 78 is telescoped within the outer case 66. The pulley frame has two side plates 80 which are connected by back strap 82. Upper roller 84 and a plurality of the lower rollers 86 are connected within the pulley frame 78 by pins extending between the side plates 80. The pin of the upper roller 84 may be removed thus removing the upper roller so that the cable 60 may be reeved within the roller frame 78 as shown in the drawings. Pin 88 is securely fastened by welding to the side plates 80. Hole 90 in the pulley frame registers with holes 76 when the cable guide is assembled.

Referring more particularly to FIG. 3, it may be seen that the cable guide is assembled by telescoping the pulley frame 78 within the outer case 66, the pins 88 fitting within the inclined slot 74. Then when pin 92 is extended through the registered hole 76 and 90, the pulley frame 78 is securely and quickly held in place within the outer case 66. Should it be necessary or desirable to splice the cable 60 or remove the cable from the guide, it may be quickly removed from or reeved through the guide. The cable may be released quickly by removing the pulley frame 78 and removing the upper pulley 84 and the cable 60 is then free of the guide.

A reel of cable may be mounted in a convenient location either upon the towing vehicle or upon the frame 10 itself. Such a reel has not been shown for clarity in the drawings. Also it will be understood that the rotating eccentric weight 38 and the belt 44 could be covered with a protective housing but such has not been shown for clarity in the drawings.

Therefore it may be seen that there has been provided a machine for laying cable underground.

Figure 4:
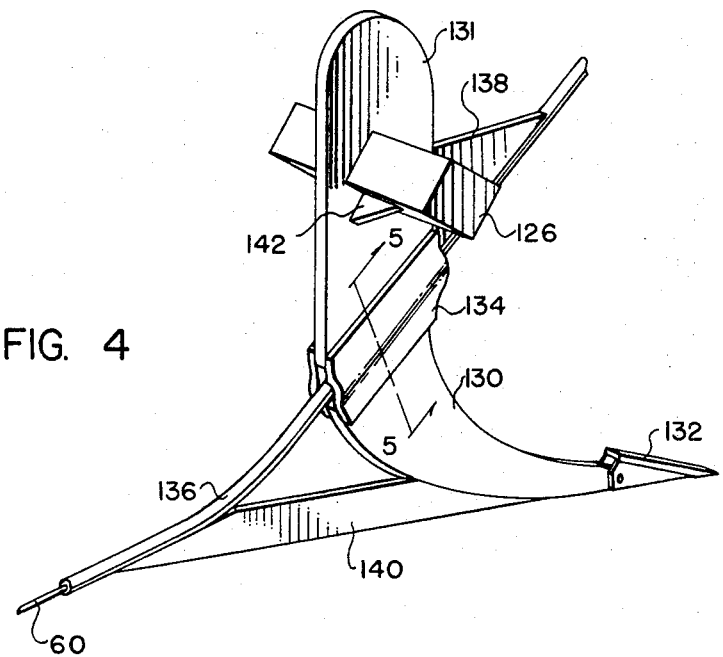
FIG. 4 is a perspective view of a second embodiment of an assembled cable guide on the shank with the beam removed from the remainder of the machine.

Referring more particularly to FIG. 4 and FIG. 5 it may be seen there has been provided another embodiment for laying a cable underground. In this embodiment beam 126 is to be attached within the frame to the side plates 12 by the clamp 28. Therefore the shank 130, 131 attached to the beam 126 is adapted to be vibrated as in the previous embodiment. In this instance the upper part of the shank 131 is welded to the beam 126 and the lower part of the shank 130 is attached thereto by scabs 134 which encircle tube 136. The tube 136 is provided that the cable 60 may be telescoped therethrough and deposited in the bottom of the furrow as previously specified. The vibrations of the machine vibrate the tube 136 and therefore aid in the sliding of the cable through the tube 136. The composite shank with the upper portion 131 and the lower portion 130 have a general curved configuration so that plow point 132 is well in advance of the vertical portion of the shank 130 and forward of the portion where the tube 136 would enter the ground on deposition of the cable 60 in the ground. The point 132 will cause the ground to be broken up in front of these elements. Gusset 138 extends from the front of the upper part of the shank 131 to the tube 136 to securely attach it in place. Foot 140 extends from the lower bottom part of the shank 130 to the lower bottom part of the tube 136 to support it in the ground.

In addition to the welding of the upper portion of the shank 131 to the beam 126, gusset 142 for added strength is welded to each side.

It will be apparent that the embodiments shown are only exemplary and that various modifications can be made in construction, materials and arrangement within the scope of the invention as defined in the appended claims.

I claim as my invention:

1. A machine for laying cable underground comprising:
    (a) a frame,
    (b) hitch means on the frame for attaching the frame to a towing vehicle,
    (c) wheels attached to the frame,
    (d) means on the frame for raising and lowering the wheels,
    (e) a plow shank pendently attached to the frame,
    (f) a horizontal shaft rotatably mounted on the frame with the axis of the shaft aligned with the direction of draft,
    (g) an eccentric weight on the shaft,
    (h) power transmission means on the frame for rotating the shaft from a towing power vehicle, and
    (j) guide means on the plow shank for guiding a cable into the furrow formed by the shank, said guide means including:
    (k) an outer case attached to the shank,
    (m) a pulley frame telescoped in the outer case,
    (n) at least one pin through the outer case and pulley frame to lock the pulley frame in the outer case, and
    (o) a plurality of pulleys on the pulley frame to guide the cable to the bottom of the furrow formed by the shank.

2. The invention as defined in claim 1 wherein
    (p) the outer case is attached to the shank by pivoting about a vertical axis.

3. A machine for laying cable underground comprising:
    (a) a frame,
    (b) hitch means for attaching the frame to a powered towing vehicle,
    (c) ground engaging wheels,
    (d) means attaching the wheels to the frame for raising and lowering the wheels,
    (e) two pedestals on the frame,
    (f) a shaft journaled to the pedestals for rotating,
    (g) the axis of the shaft aligned with the direction of draft,
    (h) a weight eccentrically attached to the shaft,
    (j) transmission means connecting the shaft to a powered vehicle for rotating the shaft,
    (k) a beam attached to the frame normal to the direction of draft,
    (m) a plow shank pendently attached to the beams,
    (n) pintles vertically attached to the rear of the plow shank,
    (o) an outer case pivoted to the pintles,
    (p) a pulley frame telescoped within the outer case,
    (q) a plurality of pins holding the pulley frame within the outer case, and
    (r) a plurality of pulleys pinned within the pulley frame:
so that a cable may be reeved ground the pulleys and guided to the bottom of the furrow formed by the vibrating plow shank.

4. In a machine for laying cable underground having:
    (a) a frame,
    (b) hitch means on the frame for attaching the frame to a towing vehicle,
    (c) wheels attached to the frame,
    (d) means on the frame for raising and lowering the wheels,
    (e) a plow shank pendently attached to the frame,
    (f) guide means on the plow shank for guiding a cable into the furrow formed by the shank;
    (g) the invention comprising in combination with the above:
    (h) means attached to the frame for vibrating the frame and thus the plow shank,
    (j) said guide means including:
        (i) an outer case attached to the shank,
        (ii) a pulley frame telescoped in the outer case,
        (iii) at least one pin through the outer case and pulley frame to lock the pulley frame in the outer case, and
        (iv) a plurality of pulleys on the pulley frame to guide the cable to the bottom of the furrow formed by the shank.

5. The invention as defined in claim 4 with the additional limitation of:

(k) the outer case attached to the plow shank by pivoting about a vertical axis.

References Cited

UNITED STATES PATENTS

| | | | |
|---|---|---|---|
| 3,211,236 | 10/1965 | Patton | 172—40 |
| 2,118,553 | 5/1938 | Garlinger | 61—72.6 |
| 2,647,758 | 8/1953 | Ryan | 61—72.6 X |
| 2,943,583 | 8/1960 | Ryan | 61—72.2 |
| 2,995,902 | 8/1961 | Wheeler | 61—72.2 |
| 3,103,250 | 9/1963 | Lamb. | |
| 3,170,300 | 2/1965 | Kelley | 61—72.6 |

FOREIGN PATENTS 1,320,979   2/1963   France.

EARL J. WITMER, *Primary Examiner.*